Aug. 3, 1954  H. B. CALDWELL  2,685,275
PRESSURE FLUID SERVOMOTOR
Filed July 13, 1950
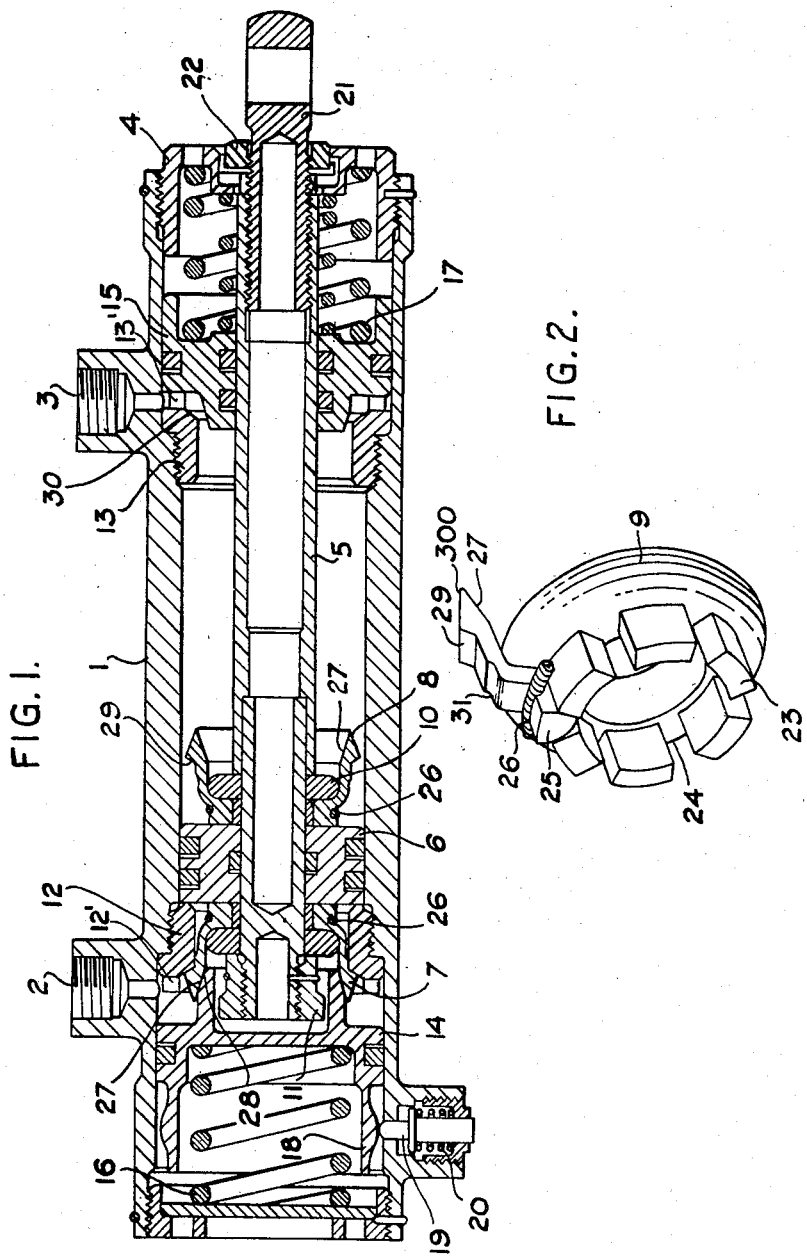
Inventor:
Harry Balshaw Caldwell;
By his attorneys,
Baldwin + Wight Patented Aug. 3, 1954

2,685,275

UNITED STATES PATENT OFFICE 2,685,275

PRESSURE FLUID SERVOMOTOR

Harry Balshaw Caldwell, Penketh, Warrington, England, assignor to Electro-Hydraulics Limited, Warrington, England, a company of Great Britain Application July 13, 1950, Serial No. 173,608

Claims priority, application Great Britain July 14, 1949

9 Claims. (Cl. 121—40)

This invention relates to pressure fluid servomotors and more particularly to automatic mechanical locking devices for telescopic jacks and concerns that type of lock which comprises a lock tongue carrying retaining means, e. g. claws, a ring through or over which the retaining means are capable of sliding and a spring biassed lock bolt adapted to hold the retaining means fixed and thus prevent them from sliding back through or over the ring. Locks of this type are particularly useful for fluid pressure operated jacks with the lock tongue fixed either to the piston rod or the cylinder.

Some of the known locks of this type suffer from the disadvantage of having considerable length whilst their construction is such as to allow of a certain amount of end float. In some cases the length of the unit, in which it may be desired to incorporate a lock device and which is constituted by a telescopic jack, due to circumstances governed by use, cannot be increased to incorporate a lock, whilst in some cases the telescopic members are required to remain in a fixed position, with no slack, when the lock is engaged.

According to one feature of the present invention, in a locking device of the type described, the lock tongue and lock bolt are positively locked together by forming the said tongue and bolt with co-operating tapers.

The inside surface of the lock tongue (or tongues) may be formed with a taper adapted, on relative movement between the lock tongue and lock bolt, to co-operate with a tapered surface formed on the outside surface of the lock bolt to give a positive lock between the said members.

According to a further feature, the lock tongue is formed of a number of rigid segments, the segments being adapted to move over a member movable with respect to the lock bolt; the lock tongue segments preferably engage in recesses in the said member, which may be of annular form with rounded edges.

If desired a lock indicator mechanism may be provided to indicate when tapered engagement of the lock tongue and lock bolt is effected.

One form of construction according to the present invention, incorporating the two features, will now be described with reference to the accompanying drawing, in which Figure 1 is a longitudinal section and Figure 2 a detail perspective view. Referring to the drawing, there is provided a fluid pressure operated jack comprising a cylinder 1 having fluid connections 2, 3 one adjacent each end. The cylinder is closed at each end by an end screw and through one end screw 4 slides a piston rod 5 carrying a piston 6. Mounted on the piston rod 5 on each side of the piston 6 are lock tongues 7, 8, the particular construction of which will be described below, and rocker supports, each constituted by a ring or disc 9, 10, having rounded edges, each ring lying within a lock tongue, the function of the rocker supports becoming apparent below. The end of the piston rod within the cylinder terminates in a lock screw nut 11 which maintains the lock tongues 7, 8 and piston construction on the piston rod 5.

The cylinder carries lock rings 12, 13 preferably and as shown through threaded engagement, one lock ring being provided adjacent each end of the cylinder, and these rings are preferably provided with end lugs 12' and 13' respectively for engagement with a wrench for turning the rings into the cylinder 1. Lock bolts 14, 15 are slidably mounted in the cylinder bore, one at each outer end thereof, the lock bolts being biassed inwardly by springs 16, 17. The lock bolt 14 has integral therewith or carries a cam member 18 which is adapted to co-operate with a plunger device 19 protruding into the end bore of the cylinder, the plunger being biassed against the cam by a spring 20 and providing means for indicating when the lock bolt 14 and lock tongues 7 are in positive locking position, the plunger indicating the locked position, when it is moved outwardly by the cam 18. The plunger, of course, can be adapted to operate any known kind of visual indicator.

The outer end of the piston rod carries an eye bolt 21 held in position by a suitable lock nut 22, whilst a number of glands are provided where necessary to provide fluid-tight seals.

The lock tongues 7, 8 are similar in construction and only one will now be described with reference to Figure 2. The lock tongue comprises a ring 9, the rounded part of which carries an annular boss 23 in which radial recesses 24 are formed and into each recess the base 25 of one of the lock tongues fits. The lock tongue unit comprises a number of rigid segments and each of these segments enters one of the recesses. The bases of the segments are grooves to receive a spring 26, formed as an annulus, by which the segments 25 are retained on the rocker 9. The protruding portion of the lock tongue 7 or 8 on its inner surface is tapered as at 27 to co-operate with a taper 28 on the outside surface of the lock bolt (see Figure 1) whilst the outer side of the lock tongue is provided with a steep taper 29 to co-operate with a similar taper 30 (see Figure 1) on the outside faces of the lock rings. Again the outer diameter of the lock tongue is stepped at 31 so that movement over the ring, which on actuation of the jack partly slides and partly locks, prevents the diameter of the lock segments increasing too much and thus prevent fouling of the lock ring 12. The portions 27, 29, and 300 of each lock tongue constitute a retaining member. Such member is shown in its normal or outermost position in Figure 1 and the radially outermost point on each retaining member is spaced from the axis of the cylinder a distance less than the internal diameter of the cylinder and, accordingly, is always spaced from the wall of the cylinder.

The jack mechanism works in the following manner: When the jack, by admitting fluid pressure through connection 2, is extended and near the end of its outward stroke, the tapered outside part 300 (Figure 2) of the lock tongue will engage in the inner diameter of the lock ring 13 and the front part of the lock tongue segments 8 will be compressed radially, preferably against the load of the spring 26. The lock bolt 15 is then moved by the lock tongues and/or the exhaust fluid pressure and when the leading edges of the lock tongues have moved through the lock ring 13, the lock bolt springs 17 come into action to move the lock bolt 15 in the opposite direction, thus pressing the faces of the tongue segments 8 against the face of the lock ring 13 due to the wedge action of the inner taper on the lock tongue and the outer taper on the lock bolt, thus providing a positive lock which has no end play. It will be appreciated that any load applied on the jack tending to break the lock is resisted by the lock bolt 15, due to its biassing spring 17.

When it is desired to close the jack, fluid pressure is admitted at connection 3 and acts on the lock bolt area to move it against its spring 17, so that fluid pressure can then actuate the jack piston, which carries with it the lock tongue 8 which, being able to close inwardly, will pass through the lock ring 13 as the lock bolt no longer prevents this action.

In the above arrangement a lock is provided at both ends of the jack, that is to say in the closed and extended positions, although, of course it will be appreciated that only one lock for either position can be provided, the action of both locks being the same. Due to the fact that the lock tongues are formed of a number of segments, the lock occupies a reduced length within the jack unit as against known types, and although the lock has been described herein as fluid pressure operated it is, of course, equally possible to operate the lock by mechanical or electrical means.

In the above constructions it will be appreciated that the lock tongues can either pass through the ring or over it, the lock tongues not necessarily being fixed to the piston and where they are not so fixed they may be held in or by the cylinder.

1. A fluid pressure servomotor comprising a cylinder, a piston slidable therein, a lock tongue carried by said piston and formed as a rigid element, means engaging and supporting said lock tongue intermediate its ends for rocking movement radially of said cylinder, a retaining member carried by one end of said lock tongue and movable radially inwardly from a normal position upon rocking movement of said lock tongue, said retaining member, when said lock tongue is in said normal position, having its radially outermost point spaced from the axis of said cylinder a distance less than the internal diameter of said cylinder, spring means biassing the other end of said lock tongue radially inwardly, a ring over which said retaining member is slidable in one direction from one side of said ring, a lock bolt at the other side of said ring mounted for movement longitudinally of said cylinder with respect to said ring, and spring means biassing said lock bolt toward said ring to a normal position into which said retaining member is movable radially outwardly between said ring and said lock bolt.

2. A fluid pressure servomotor comprising a cylinder, a piston slidable therein, a lock tongue carried by said piston and formed as a rigid element, means for supporting said lock tongue for rocking movement radially of said cylinder, a retaining member carried by said lock tongue and movable radially inwardly from a normal position upon rocking movement of said lock tongue, said retaining member, when said lock tongue is in said normal position, having its radially outermost point spaced from the axis of said cylinder a distance less than the internal diameter of said cylinder, a ring over which said retaining member is slidable in one direction from one side of said ring, a lock bolt at the other side of said ring mounted for movement longitudinally of said cylinder with respect to said ring, and spring means biassing said lock bolt toward said ring to a normal position into which said retaining member is movable radially outwardly between said ring and said lock bolt, said retaining member and said lock bolt having coacting tapers, the taper on said lock bolt, when the latter is in said normal position, being arranged radially inwardly of and engaging the taper of said retaining member to prevent radially inward movement thereof.

3. A fluid pressure servomotor comprising a cylinder, a piston slidable therein, a lock tongue carried by said piston and formed as a rigid element, means for supporting said lock tongue for rocking movement radially of said cylinder, a retaining member carried by said lock tongue and movable radially inwardly from a normal position upon rocking movement of said lock tongue, said retaining member, when said lock tongue is in said normal position, having its radially outermost point spaced from the axis of said cylinder a distance less than the internal diameter of said cylinder, a ring over which said retaining member is slidable in one direction from one side of said ring, a lock bolt at the other side of said ring mounted for movement longitudinally of said cylinder with respect to said ring, and spring means biassing said lock bolt toward said ring to a normal position into which said retaining member is movable radially outwardly between said ring and said lock bolt, said means for supporting said lock tongue for rocking movement comprising a member carried by said piston and having a radially outer curved surface engaging said lock tongue intermediate the ends thereof to support it for rocking movement.

4. A fluid pressure servomotor as claimed in claim 3 wherein said last-named member, at the side thereof opposite the retaining member of said lock tongue, is provided with a radial slot in which the corresponding end of said lock tongue is arranged.

5. A fluid pressure servomotor comprising a cylinder, a piston slidable therein, a plurality of circumferentially spaced rigid lock tongues extending generally longitudinally of said cylinder, means carried by said piston engaging and supporting said lock tongues intermediate their ends for rocking movement in radial planes relative to said cylinder, a retaining member carried by one end of each lock tongue and movable inwardly from a normal position upon rocking movement of said lock tongue, each retaining member when its lock tongue is in said normal position, having its radially outermost point spaced from the axis of said cylinder a distance less than the internal diameter of said cylinder, a spring annulus surrounding and engaging the other ends of said lock tongues to urge them radially inwardly, a stationary ring over which said retaining members are slidable, upon movement of said piston in one direction from one side of said ring, a lock bolt slidable in said cylinder at the opposite side of said ring, and spring means biassing said lock bolt toward said ring to an operative position spaced therefrom for the reception between said ring and said lock bolt of a portion of each retaining member.

6. A fluid pressure servomotor comprising a cylinder, a piston slidable therein, a plurality of circumferentially spaced rigid lock tongues extending generally longitudinally of said cylinder, means carried by said piston for supporting said lock tongues for rocking movement in radial planes relative to said cylinder, a retaining member carried by each lock tongue and movable inwardly from a normal position upon rocking movement of said lock tongue, each retaining member when its lock tongue is in said normal position, having its radially outermost point spaced from the axis of said cylinder a distance less than the internal diameter of said cylinder, a stationary ring over which said retaining members are slidable, upon movement of said piston in one direction from one side of said ring, a lock bolt slidable in said cylinder at the opposite side of said ring, and spring means biassing said lock bolt toward said ring to an operative position spaced therefrom for the reception between said ring and said lock bolt of a portion of each retaining member, each retaining member being provided with an inner tapered face increasing in diameter toward said lock bolt, said lock bolt being provided with a tapered face concentric with the axis of said cylinder and decreasing in diameter toward said lock tongues to engage said tapered faces of said retaining members to prevent radially inward movement thereof when said locking member is in said normal position.

7. A fluid pressure servomotor comprising a cylinder, a piston slidable therein, a plurality of circumferentially spaced rigid lock tongues extending generally longitudinally of said cylinder, means carried by said piston for supporting said lock tongues for rocking movement in radial planes relative to said cylinder, a retaining member carried by each lock tongue and movable inwardly from a normal position upon rocking movement of said lock tongue, each retaining member when its lock tongue is in said normal position, having its radially outermost point spaced from the axis of said cylinder a distance less than the internal diameter of said cylinder, a stationary ring over which said retaining members are slidable, upon movement of said piston in one direction from one side of said ring, a lock bolt slidable in said cylinder at the opposite side of said ring, and spring means biassing said lock bolt toward said ring to an operative position spaced therefrom for the reception between said ring and said lock bolt of a portion of each retaining member, said means for supporting said lock tongues for rocking movement comprising an annular member carried by said piston and having a rounded radially outer edge engaging each lock tongue to support it for said rocking movement.

8. A fluid pressure servomotor as claimed in claim 7 wherein said annular member, at the side thereof opposite said retaining members, is provided with a plurality of radial notches each receiving the corresponding end of one of said lock tongues, each retaining member being provided an inner tapered face increasing in diameter toward said lock bolt, said lock bolt having a tapered face concentric with the axis of said cylinder and decreasing in diameter toward said lock tongues to engage said tapered faces of said retaining members to prevent radially inward movement thereof when said locking member is in said normal position.

9. A fluid pressure servomotor as claimed in claim 7 wherein said annular member, at the side thereof opposite said locking members, is provided with radial notches each receiving the corresponding end of one of said lock tongues.

References Cited in the file of this patent

UNITED STATES PATENTS

| Number | Name | Date |
|---|---|---|
| 2,221,979 | Levy | Nov. 19, 1940 |
| 2,297,902 | Levy | Oct. 6, 1942 |

FOREIGN PATENTS

| Number | Country | Date |
|---|---|---|
| 362,577 | Italy | Aug. 30, 1938 |
| 715,739 | Germany | June 6, 1942 |
| 896,839 | France | May 8, 1944 |
| 570,897 | Great Britain | July 27, 1945 |